July 29, 1969   J. S. SCOGGIN   3,458,494
PROCESS FOR RECOVERING OLEFIN POLYMERS
Filed July 15, 1964   2 Sheets-Sheet 1

INVENTOR.
J. S. SCOGGIN
BY Young & Quigg
ATTORNEYS

INVENTOR.
J. S. SCOGGIN
BY Young & Quigg
ATTORNEYS 3,458,494
PROCESS FOR RECOVERING OLEFIN
POLYMERS
Jack S. Scoggin, Bartlesville, Okla., assignor to Phillips
Petroleum Company, a corporation of Delaware
Filed July 15, 1964, Ser. No. 382,746
Int. Cl. C08f 1/88, 47/00
U.S. Cl. 260—94.9
2 Claims

ABSTRACT OF THE DISCLOSURE

Solid polymer essentially free of solvent is obtained by introducing a high concentration polymer solution into a flash zone wherein the polymer solution is first flashed and the resulting molten polymer is then additionally concentrated by being passed over heated baffle means and then collected and thereafter extruding the resulting concentrated molten polymer.

---

This invention relates to a process and apparatus for producing molten polymers. In one aspect this invention relates to a process and apparatus for olefin polymerization at high concentration of normally solid polymer.

The formation of polyolefins in a high polymer concentration system is known, as disclosed in U.S. Patent 2,894,824. In this process, considerable solvent is added to the reaction effluent to permit the recovery of catalyst from the solution. While such an operation is satisfactory, in some instances it is desirable to use a minimum amount of solvent so as to avoid the necessity of providing, subsequent to the use of the solvent, a recovery system for separating the solvent and for providing the polymer in a form suitable for additional handling.

Accordingly, it is an object of the present invention to provide an improved process and apparatus for the solution polymerization of olefins. Another object is to greatly reduce the ratio of solvent to produced polymer in a solution polymerization process for the production of normally solid polymer. A further object is to provide a solution polymerization process for the production of normally solid polymer from 1-olefins which eliminates the catalyst removal step and provides the desired polymer in a form suitable for immediate extrusion.

Other objects, aspects and advantages of the invention will be readily apparent to those skilled in the art from the following discussion, the appended claims, and the drawing, which is a diagrammatic view of the inventive process and apparatus.

According to this invention there is provided a process for producing normally solid olefin polymer which comprises feeding an aliphatic 1-olefin having from 2 to 8 carbon atoms per molecule and no chain branching nearer the double bond than the 4-position into a high-solids concentration reaction zone; feeding into said reaction zone a hydrocarbon solvent for said polymer and said olefin and also finely divided catalyst consisting of chromium oxide supported on at least one component of the group consisting of silica, alumina, zirconia, and thoria, at least a portion of the chromium being in the hexavalent state at initial contacting of hydrocarbon and catalyst; maintaining said catalyst dispersed in the olefin-solvent mixture in said reaction zone; withdrawing from said reaction zone a solution of polymer and solvent; passing the withdrawn solution to a flash zone having baffles therein wherein solvent is substantially removed therefrom, thereby concentrating the polymer in a molten form; flowing while simultaneously additionally concentrating the resulting molten polymer across said baffles and into an extrusion zone wherein the concentrated molten polymer is extruded and dried; and thereafter recovering the solid extruded polymer as a product of the process containing not more than 0.02 weight percent of catalyst.

A high ratio of olefin to solvent and to catalyst is maintained in the feed to the reaction zone so that the concentration of polymer in the resulting solution is at least 20 weight percent and the concentration of catalyst therein is so low that the concentration of catalyst in the polymer product, without removal of catalyst, is not more than about 0.02 weight percent, which meets commercial specifications. The catalyst used is a highly active powdered catalyst having a maximum particle size of 100 microns, 50 percent thereof being below 10 microns in size, and consisting essentially of chromium oxide deposited on a silica support, at least a portion of the chromium being hexavalent in form at the initial contacting with the olefin. While the preferred support is silica-alumina, the alumina may be partially or totally substituted by zirconia and/or thoria. The chromium oxide in the catalyst is in the range of 0.1 to 10 weight percent and is ordinarily about 1.5 to 3 weight percent of the composite catalyst. The solution polymerization process, with the exception of the specific operating conditions set forth herein, is fully disclosed in U.S. Patent 2,825,721 of Hogan and Banks. This patent also discloses the catalyst and the methods of making the same.

By maintaining the ratio of catalyst to polymer low, removal of catalyst from the resulting solution of polymer is not necessary, the final catalyst concentration in the produced polymer being not more than 0.02 weight percent. In addition, by having a system utilizing a reduced solvent circulation, a "tight solvent loop" is achieved which permits low solvent circulation per pound of produced polymer, thereby permitting improved purification of the solvent to such an extent that catalyst productivity is sufficiently high to maintain the catalyst-to-polymer ratio at the low level required for leaving the residual catalyst in the polymer.

The present invention utilizes a high-solids reactor in combination with a novel single stage flash for solvent removal. High-solids reactors may contain augers and/or scraper blades which permit handling of solutions containing a high concentration of polymer. The high-solids reactor may be of the type disclosed in the patent to Lanning, U.S. 2,894,824, or other high viscosity reactor such as those available from Crawford and Russell, Engineers and Contractors, Stamford, Conn. The so-called C & R reactor is exceptionally well-adapted to the high-solids solution process of this invention. The C & R reactor utilizes a cylindrical reaction chamber surrounded by a cooling annulus and an annular reaction zone concentric with the cooling annulus and surrounded by a second concentric cooling annulus with scraper blades rotating over both walls of the annulus and the wall of the cylindrical reaction chamber.

The reactor may be constructed to utilize cooling by autorefrigeration of solvent, thereby either eliminating or supplementing the jacket cooling.

The invention is applicable to the polymerization of aliphatic 1-olefins having from 2 to 8 carbon atoms per molecule and no chain branching nearer the double bond than the 4-position. These olefins include those disclosed in the aforesaid Hogan and Banks patent, particularly ethylene, propylene, 1-butene, 1-pentene, 1-hexene, 1-heptene, 1-octene, 4-methyl-1-pentene, butadiene and isoprene. Homopolymers and copolymers may be made by this process. Substantially pure ethylene may be polymerized by this process or ethylene may be copolymerized with any one or more of the other monomers, particularly in minor concentration to produce a copolymer or tripolymer consisting principally of ethylene polymer. Butene-1 is commonly utilized in minor concentration in the ethylene feed to produce a polyolefin which has exceptionally desirable properties.

A more complete understanding of the invention may be obtained by reference to the accompanying drawing, of which:

Figure 1:
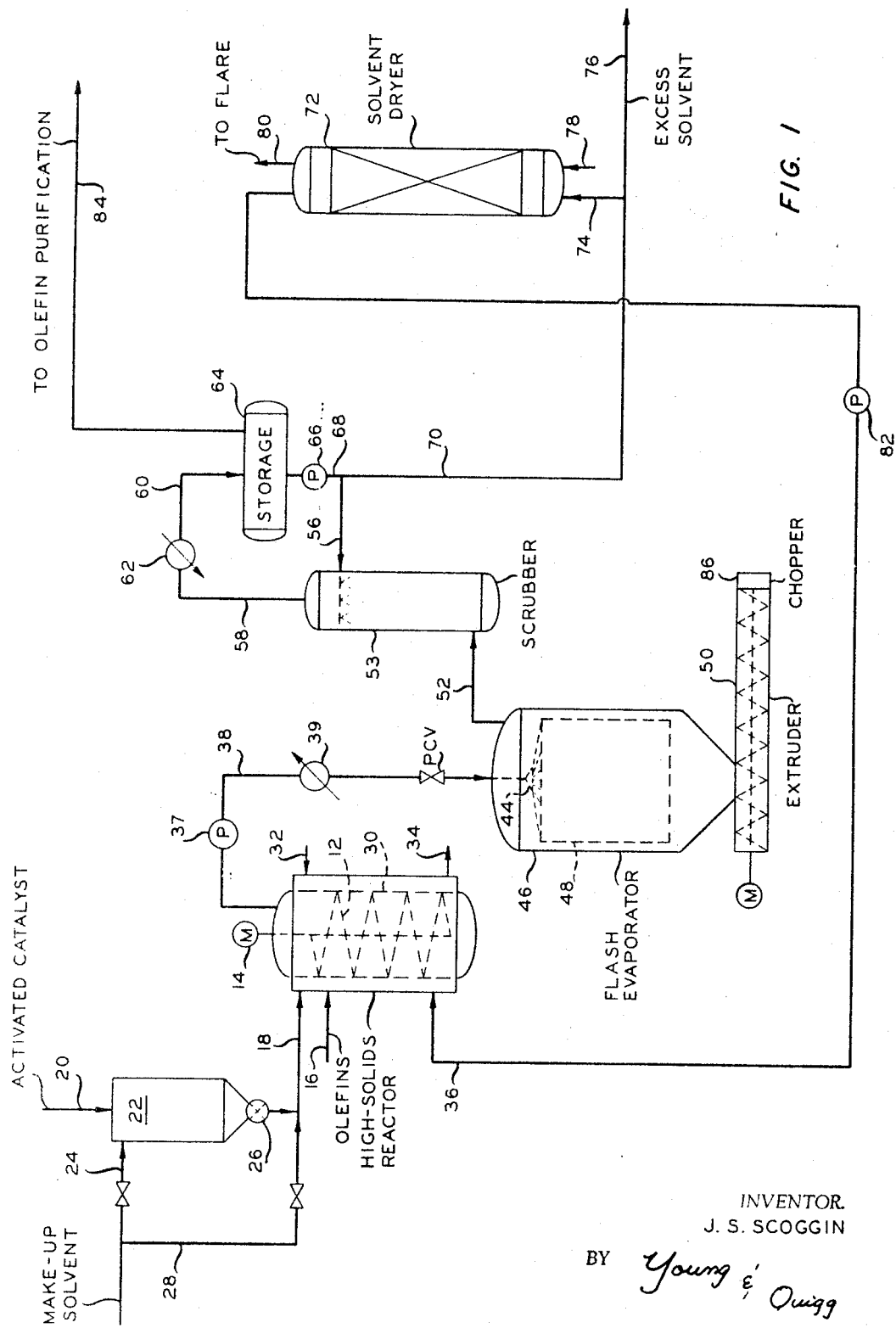
FIGURE 1 is a schematic illustration of a preferred arrangement of plant apparatus for producing polyolefins by the solution process.

Referring to FIGURE 1, a high-solids reactor 10 is provided with scraper and/or auger means 12 operated by motor 14. Olefin feed is introduced to the reactor via line 16 and a suspension of finely divided chromium oxide catalyst in diluent is introduced through line 18. Activated catalyst from line 20 enters catalyst mud tank 22 along with make-up solvent from line 24 in sufficient volume to form a catalyst mud which is fed by feeder 26 into line 18 as a catalyst mud which is mixed with solvent from line 28 to form a suitable suspension of catalyst in solvent and provide the required amount of make-up solvent to maintain the desired solvent concentration in the reactor.

Reactor 10 is preferably jacketed as illustrated by jacket 30, through which coolant is circulated via lines 32 and 34. Recycle solvent is introduced to the reactor through line 36 and effluent solution of polymer is withdrawn through line 38. If desired, a pump 37 is employed in line 36 to pass the effluent. The effluent is then flashed through nozzle 44 into flash tank 46 onto heat exchanger plates 48. As the effluent runs down the plates in a thin film, solvent evaporates, leaving a polymer melt which feeds extruder 50. Solvent vapor is removed from flash tank 46 to scrubber 53.

Line 52 conducts solvent vapor from contactor 46 to scrubber 53 where the vapor is contacted in countercurrent flow with liquid solvent introduced through line 56. A portion of the liquid solvent is thus vaporized while cooling the vapors and passes overhead along with solvent vapor introduced through line 58, via line 60 through condenser 62 into storage tank 64. The stored liquid solvent is circulated by pump 66 through line 68 to lines 56 and 70, that passing to line 70 being circulated through solvent dryers 72 from line 74. Excess solvent is removed via line 76.

Dryers 72, usually utilized in pairs to permit regeneration, are packed with activated alumina which purifies the solvent by removing water and other deleterious components of the solvent stream. Regeneration gas is passed through the dryers from line 78 and passed to a flare or steam exhaust via line 80 when being regenerated. Purified solvent is passed through line 36 under the impetus of pump 82 to reactor 10.

Olefins separating from liquid solvent in storage tank 64 are passed to olefin purification via line 84 from which the olefins may be recycled to reactor 10 by means not shown. Polymer strands emerging from extruder 50 are chopped by chopper 86 and recovered for subsequent handling.

Figure 2:
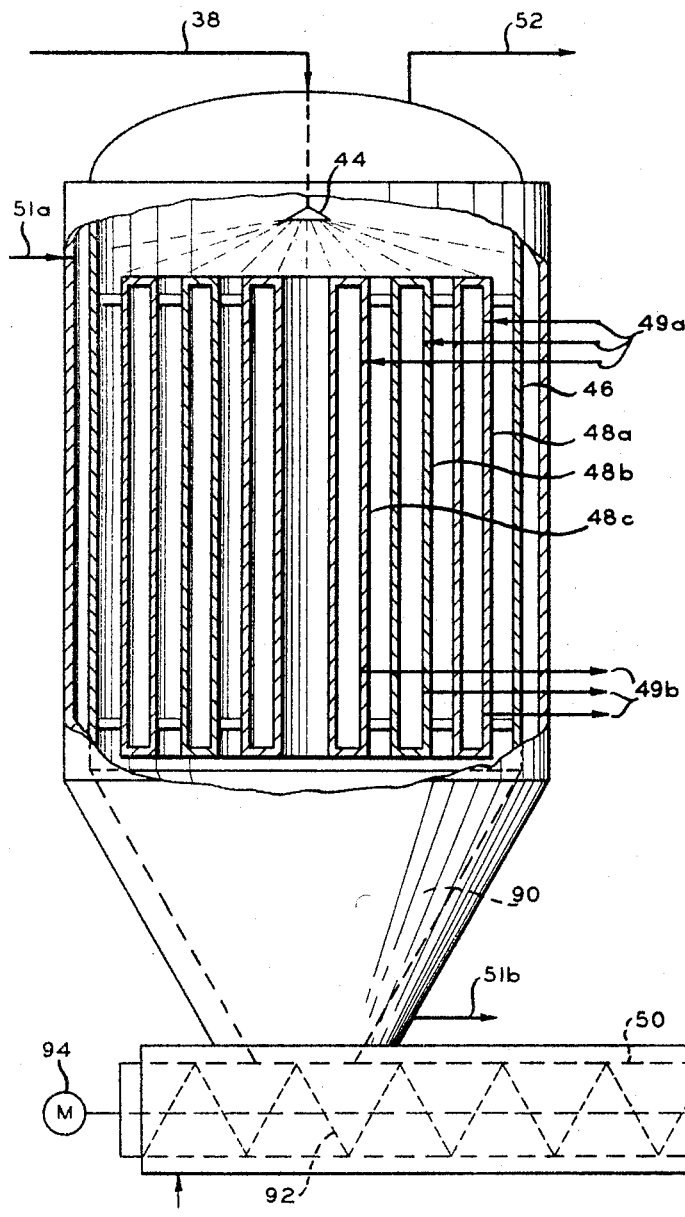
FIGURE 2 is a more detailed view of the flash evaporator of FIGURE 1.

As shown in FIGURE 2, reactor effluent is flashed by means of nozzle 44 into flash chamber 46. Flash chamber 46 is provided with a plurality of cylindrical coil plates such as 48a, 48b and 48c. The resulting molten polymer falls on coil plates and flows downwardly to zone 90. The coil plates are so provided as to allow imparting of heat to the surface thereof through lines 49a and 49b. Also, heat can be supplied to the walls of the chamber through lines 51a and 51b. In this manner the temperature of the polymer is maintained such that the polymer is molten and solvent not removed in the flashing procedure is evaporated and removed from the chamber through line 52. The molten polymer after leaving the surface of coil plates 48a, 48b and 48c drops into zone 90, which serves as a hopper feed bin, to extruder 50 wherein it is extruded by means of screw 92 driven by motor 94 through die member 96 for cutting recovery of the polymer pellets for subsequent use by means of pelletizer 98.

Figure 3:
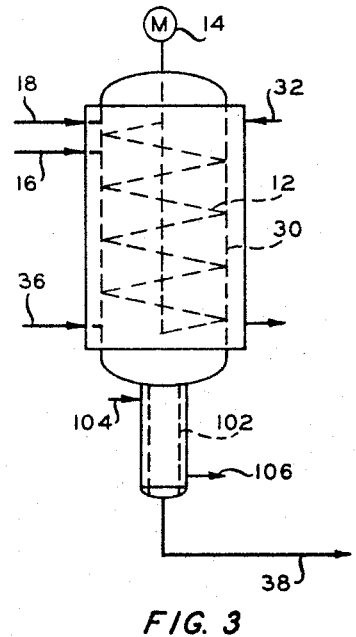
FIGURE 3 is a schematic representation of a modification of the high-solids reactor of FIGURE 1.

As shown in FIGURE 3, high-solids reactor 10 is provided with outlet line 38 for removal of the polymer from a lower area of the reactor. Associated with line 38 at the base of the reactor is jacketed heating leg 102. Lines 104 and 106 are so provided as to allow introduction of a source of heat to leg 102. By adding heat to the jacketed leg 102 the amount of monomer and solvent removed in line 38 is reduced. Sufficient heat is supplied to the jacketed leg 102 to raise the temperature of the material therein to a point whereby the monomer and solvent tend to return to the main zone of the reactor 10, thereby resulting in additional concentration of the polymer being removed from the reactor to the flash chamber.

To illustrate the invention, reference is made to an ethylene polymerization process in a high-solids reactor as illustrated in the drawing.

In this process, ethylene is fed into the reactor at the rate of about 76,749 pounds per day at a temperature of about 230° F. Activated catalyst consisting essentially of chromium oxide (a portion hexavalent) deposited on silica-alumina (chromium oxide concentration about 2 weight percent) in finely divided form, 50 weight percent being less than 10 microns in size, is admixed with cyclohexane (as the solvent feed) and the resulting catalyst slurry is fed to the reactor at the rate of 14.4 pounds of catalyst and 6,000 pounds of cyclohexane per day. By means of circulating cooling water through the jacket of the reactor, the temperature is maintained at about 260° F. and the reactor pressure is controlled at about 450 p.s.i.a.

The effluent solution of polymer, containing about 40 weight percent polymer, is heated to a temperature of about 520° F. and pressure of 1000 p.s.i.a. is passed to a flash chamber wherein the pressure is about 2–5 p.s.i.g. Flashing the cyclohexane from the reactor effluent concentrates the polymer to above 98 weight percent and the concentration of catalyst in the polymer is about 0.02 weight percent or less.

The polymer melt is introduced to the extruder at a rate of about 73,442 pounds per day and its polymer content is 72,000. This total melt contains about 14.4 pounds of catalyst and about 1428 pounds of cyclohexane, or 1.94 weight percent cyclohexane, which is removed during the course of extrusion.

In carrying out the process of this invention, the reactor is maintained at a temperature in the range of 200–520° F., preferably 260° F., at a pressure within the range of 400 to 500 p.s.i.a.

The high solids effluent leaving the reactor is flashed in a flash tank wherein the temperature is maintained in the range of 300 to 600° F. at a pressure in the range of 2 to 5 p.s.i.g. The effluent leaving the high-solids reactor generally has a polymer concentration ranging from 20 to 50. The effluent is then raised to a temperature of 300 to 600° F. to insure flashing of the solvent in the flash tank.

Various modifications of this invention can be made, or followed, in view of the foregoing disclosure and discussion, without departing from the spirit or scope thereof.

I claim:

1. A process for recovering normally solid olefin polymers of at least one aliphatic 1-olefin having from 2 to 8 carbon atoms per molecule and no chain branching nearer the double bond than the 4-position from a solution thereof containing from 20 to 50 weight percent of polymer in a solvent selected from the group consisting of aliphatic paraffins and cycloparaffins of 3 to 12 carbon atoms per molecule which comprises the steps:

(a) introducing said solution while at a temperature in the range of 200 to 520° F. and a pressure in the range of 40 to 500 p.s.i.a. into a first and upper zone of an elongated flash zone maintained at a temperature in the range of 300 to 600° F. and a pressure in the range of 2 to 5 p.s.i.g. whereby a substantial portion of solvent is removed from said solution and the polymer solution is initially concentrated into a molten form;

(b) flowing the resulting concentrated molten polymer over a series of heated elongated baffle means disposed in a second zone and below said first zone of said flash zone whereby the concentrated molten polymer is further concentrated so as to remove essentially all remaining solvent from the molten polymer concentrate;

(c) collecting the resulting essentially solvent free molten polymer in a third and lower zone of said flash zone;

(d) passing the resulting concentrated and molten essentially solvent-free polymer into an extrusion zone wherein the concentrated molten polymer is extruded and (e) thereafter recovering the solvent-free solid extrudate of polymer as a product of the process.

2. The process according to claim 1 wherein said 1-olefin is ethylene and said solvent is cyclohexane.

References Cited

UNITED STATES PATENTS

| | | | |
|---|---|---|---|
| 2,825,721 | 3/1958 | Hogan | 260—94.9 |
| 2,894,824 | 7/1959 | Lanning | 260—94.9 |
| 2,943,123 | 6/1960 | Ross | 260—94.9 |
| 2,964,513 | 12/1960 | Dale | 260—93.7 |
| 3,060,107 | 10/1962 | Smith | 202—64 |
| 3,081,290 | 3/1963 | Cottle | 260—94.9 |
| 3,132,125 | 5/1964 | Schwander | 260—94.9 |
| 3,239,498 | 3/1966 | Witt | 260—94.9 |

JAMES A. SEIDLECK, Primary Examiner

159—49; 203—89; 260—93.7, 94.3

U.S. Cl. X.R.